United States Patent [19]

Khanin

[11] 3,857,401

[45] Dec. 31, 1974

[54] METHOD OF ELIMINATING VIBRATIONS OF THE REGULATING VALVE

[76] Inventor: Grigory Alexandrovich Khanin, Institutsky prospekt 29, kv. 45, Leningrad, U.S.S.R.

[22] Filed: June 5, 1972

[21] Appl. No.: 259,803

[52] U.S. Cl.................... 137/1, 137/802, 251/369
[51] Int. Cl............................................ F16k 47/00
[58] Field of Search ................ 137/1, 802; 251/369

[56] References Cited
UNITED STATES PATENTS
3,347,252    10/1967    Hanson............................... 137/82

Primary Examiner—Alan Cohan
Assistant Examiner—Gerald A. Michalsky
Attorney, Agent, or Firm—Holman & Stern

[57] ABSTRACT

A regulating valve is provided in a fluid medium in a feed line and the valve comprises a stem coupled to an actuator and includes a head arranged in a flow chamber of the valve to control the fluid medium flow rate by varying a valve opening between the head and the seat of the valve. The method of eliminating mechanical vibrations of the regulating valve consists in: determination of the natural frequency of the mechanical vibration of the valve operating means during stem uplift corresponding to the mode of the valve vibration; determination of the natural frequency of the acoustical vibration of the fluid medium in the flow chamber of the valve during the uplift of the stem; and comparing the frequencies obtained and bringing out of coincidence the frequency of the acoustic vibration of the fluid medium and the natural frequency of the mechanical vibration of the valve operating means.

5 Claims, 2 Drawing Figures

METHOD OF ELIMINATING VIBRATIONS OF THE REGULATING VALVE

BACKGROUND OF THE INVENTION

1. Field of the Invention

The present invention relates to the methods of obtaining dependable operation of a regulating valve of turbomachines and more particularly to the methods of eliminating vibrations of the regulating valve.

The invention can be readily embodied in the regulating valves of steam turbines.

2. Description of the Prior Art

A disadvantage common in known types of regulating valves provided in the fluid medium feed line is that they all tend to vibrate, which, over long periods, results in the valve's breakdown.

Known in the art is a method of eliminating vibrations of the regulating valve (see the Soviet magazine, "Teploenergetica" No. 3, 1963: "Concerning the causes of unstable operation of the regulating valves in heavy-duty steam turbines" by Yu. V. Rzheznikov and E. A. Boitsov). By this method, the regulating valve is provided in the flow chamber in steam supply line. The valve includes operating means comprising a stem coupled to an actuator plus a head, said head is accomodated in the flow chamber of the valve to control the flow rate of the fluid medium by varying the valve opening between the head proper and a valve seat. Some of the modes of operation induce self-excited vibrations of the operating means of the valve, these self-excited vibrations bring about faults in the valve operation, and in some cases, a break down of the stem rendering the valve inoperative. The damaged valve causes shutdown of the turbine and considerable damage to the working parts when eliminating the vibrations of this regulating valve, in the prior art, they proceeded on an assumption that vibration is the result of the hydrodynamic instability of the working fluid flow and to deal with the hydrodynamic instability of the flow, the head and the seat of the valve were specially profiled.

This, however, did not satisfactorily eliminate the vibrations of the valve, since they failed to take into account the acoustic vibrations of the working fluid medium in the flow chamber of the valve. When the working fluid medium is flowing in the flow chamber of the valve, a drop in static pressure occurs in the space between the head and the seat, this drop generating a force which acts on the valve head. In the first half-period of the vibrations of the valve head (as the head approaches the seat), the directions of this force and movement of the head travel coincide, while in the second half-period, they are oppositely directed or are in opposition.

As mentioned immediately above, the downward force exerted by the fluid flow on the valve during the first half-cycle of valve vibration (the valve head moves downward) coincides with the direction of the valve movement speed. During the second vibration half-period (the valve moves upward), the force and speed have opposite directions.

During the first half-period of valve vibration, the flow force acting on the valve performs work as a result of which the flow energy is transmitted to the valve, maintaining automatic oscillations thereof.

Also present in the flow chamber of the regulating valve are the acoustic vibration of the working fluid medium, whose natural frequency varies with the travel of the valve head.

The position of the head corresponding to the matching of the natural frequency of the acoustic vibration in the flow chamber of the valve with the natural frequency of the longitudinal mechanical vibration of the operating means or system gives rise to a vibration of the operating system of the valve.

The process of vibration is of a self-excited nature.

As experience operating steam turbines with high and supercritical steam parameters proves, vibrations and the resulting faults of regulating valves are one of the common causes of breakdowns in steam distribution systems.

In some cases, these breakdowns lead to long idle periods of turbines or their operation at limited modes and impair the installation of new equipment into operation, which brings about heavy material damage great losses and inefficiencies.

SUMMARY OF THE INVENTION

It is an object of the present invention to prolong the service life of a regulating valve.

Another object of the present invention is to improve the operating reliability of the valve.

According to these and other objects of the invention, the subject-matter of the present invention lies in that the method of eliminating vibrations of the regulating valve provided in the working fluid medium feed line, whose operating system means or a stem coupled to an actuator and a head accomodated inside the flow chamber of the valve to control the flow rate of the working fluid medium by varying the valve opening between the head and seat of the valve; according to the invention the improvement, consists in the determination of the natural frequency of the mechanical vibration of the operating system of the valve during an uplift of said stem, which corresponds to the mode of the valve vibrations; determination of the natural frequency of the acoustic vibration of the working medium in the flow chamber of the valve during the very same uplift of the stem; comparison of the obtained values of frequencies and the bringing out of coincidence the natural frequency of the acoustic vibration of the working fluid medium and the natural frequency of the mechanical vibration of the operating system of the valve.

It is expedient that the natural frequency of the mechanical vibration of the valve operating system be determined at least for the first form of the longitudinal mechanical oscillation, since the first form of the longitudinal mechanical vibration of the valve mobile system has the maximum amplitude and it is the frequency of this first form that gives rise to the self-excited vibration of the valve operating means or system. "Natural frequency of the first form" is the natural frequency of the fundamental tone, i.e., a form of oscillations having one vibration mode.

It is feasible that the natural frequency of the acoustic vibration of the working medium in the valve flow chamber be determined within the range of frequencies of the acoustic vibration, the upper limit of said range being at least twice as high as the natural frequency of the longitudinal mechanical vibration of the valve mobile system, with the lower limit being at least twice as low as the natural frequency of the longitudinal mechanical vibration of the valve mobile system.

The acoustic vibrations of the working fluid medium with a frequency outside the above range of frequencies generally do not excite valve vibrations.

It is preferable that the bringing out of coincidence the natural frequency of the mechanical vibrations of the valve mechanism be accomplished by varying the dimensions of the mechanism or operating system and/or its mass.

It is preferable that the variation of the natural frequency of the acoustic vibration of the working fluid medium in the valve flow chamber be accomplished by varying the shape and/or dimensions of the valve chamber.

The use of the proposed method of eliminating vibrations of the regulating valves, according to the invention, helps ensure the safety of the regulating valves of steam turbines in operation, reduce idle periods of power equipment and costs involved in the repair of regulating valves, with an appreciable total reduction in operating costs at power stations.

The method of eliminating vibrations of the regulating valves, according to the invention, as applied to the highpressure regulating valve of a turbine with supercritical steam parameters, has shown the absence of valve vibrations within the whole range of the turbine operating modes.

Other objects and advantages of the proposed invention will be more apparent from the following exemplary embodiments and the appended drawings, wherein:

DESCRIPTION OF THE PREFERRED EMBODIMENTS

Some of the operating modes of the regulating valve provided in the line of feed of steam to turbine create conditions when the natural frequency of the acoustic vibration of steam in the valve flow chamber coincides with the natural frequency of the longitudinal mechanical vibration of the valve operating system. "Natural frequency" of valve vibrations is the frequency of "free" vibrations of the valve. As will by referred to below, the "first form" of valve vibrations occurs when vibrations have one node at the upper end of the valve stem. Further, "natural frequencies" of mechanical vibrations of the valve and steam vibrations in the flow cavity thereof can be determined experimentally or calculated by any conventional method. As a result, self-excited vibrations develop that destroy the regulating valve. To avoid self-excited vibrations, the natural frequency of the mechanical vibration of the valve system should be determined during valve stem uplift that corresponds to a vibration mode. After that, the very same uplift of the stem helps determine the natural frequency of the acoustic vibration of steam in the valve flow chamber, but the valve must be either damped or said natural frequency of the acoustic vibration of steam in the valve flow chamber should be determined at such a position of the stem that is close to or substantially its position giving rise to valve vibrations.

The obtained frequencies are subject to comparison and brought out of coincidence from resonance.

The determination of the natural frequency of the acoustic vibration of steam in the flow chamber of the regulating valve and bringing it out of coincidence could be accomplished right on the turbine during natural operation. This however involves great technical and organization difficulties. Therefore, the determination of the natural frequency of the acoustic vibration of steam in the valve chamber and the bring out of coincidence of the valve are accomplished on an installation by means of compressed air on a mock-up of the regulating valve. Simulation of the regulating valve is achieved by obtaining the identity of the natural frequencies of the acoustic vibration of air in the flow chamber of the mocked-up regulating valve and of steam in the flow chamber of the regulating valve to be controlled. The natural frequency of the longitudinal mechanical vibration of the mobile system of the mocked-up regulating valve is selected to be equal to the natural frequency of the longitudinal mechanical vibration of the system of the actual valve, in operation is determined by a well-known method.

The natural frequency of the longitudinal mechanical vibration of the valve system is determined by the first form of the longitudinal mechanical vibration, as said first form possesses the maximum amplitude and the frequency of this first form gives rise to self-excited vibration of the valve mobile system.

Figure 1:
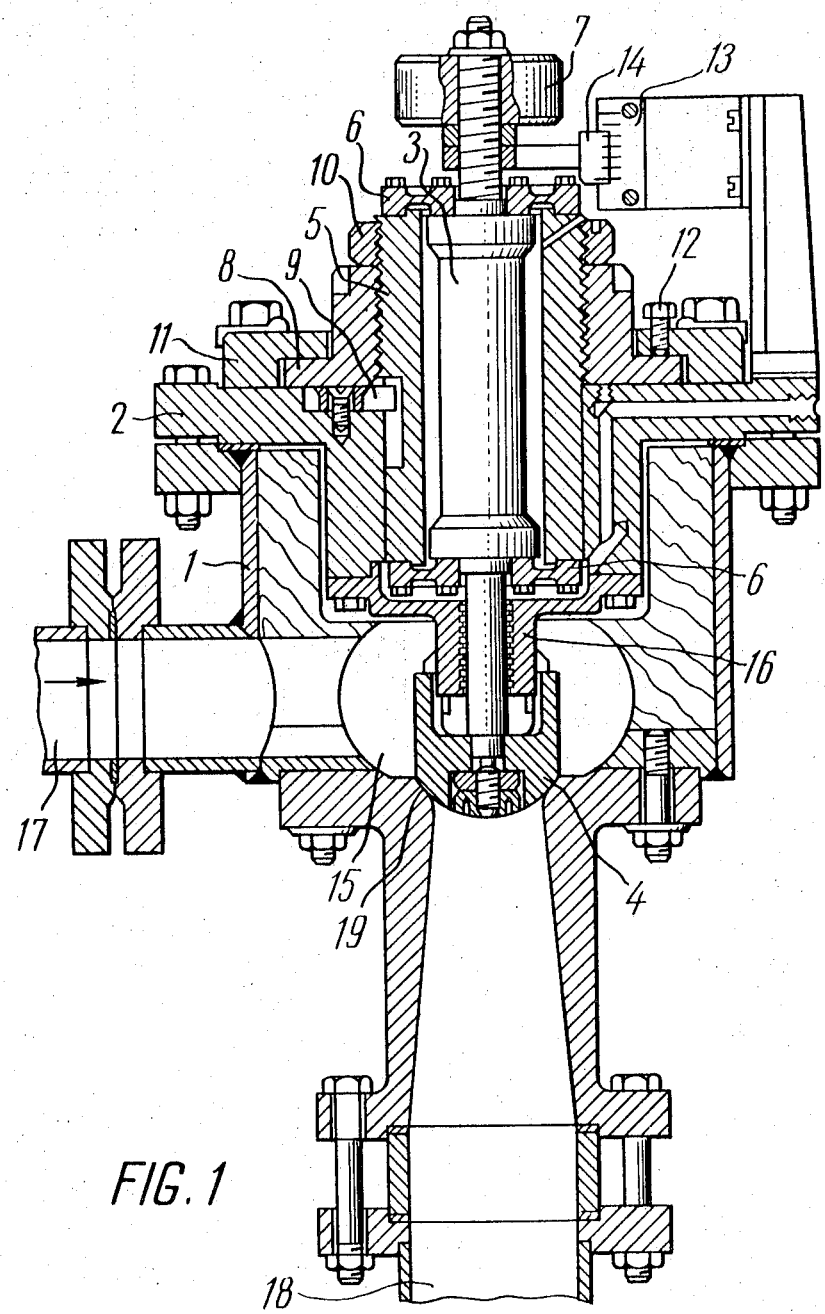
FIG. 1 is a schematic cross-sectional view of a type of the valve for determining the natural frequency of the acoustic vibration of the working fluid medium in the valve flow chamber and the natural frequency of the mechanical vibration of the operating means or system.

A body 1 (FIG. 1) of the mock-up of the regulating valve has a cover 2 mounted on which is an actuator for operating the mocked-up valve, said actuator comprising a stem 3 with a head 4.

The stem 3 is connected with a traveling bush 5 by means of an elastic suspension comprising two ring plates 6. Screwed on the threaded end of the stem 3 is a variable weight 7. By selecting the thickness of the ring plates 6, one may secure a required value of the natural frequency of the longitudinal mechanical oscillation of the valve; the weight 7 serving to help control this frequency. The actuator of the stem 3 comprises a sliding nut 8, a spline key 9, a lock nut 10, and a ring holder 11, the sliding nut 8 is locked by bolts 12.

To measure the value of an uplift of the stem 3, there is a scale 13 with a vernier 14. A labyrinth packing 16 is designed to reduce leaks of air from the flow chamber 15 of the mocked-up regulating valve.

An air supply pipe 17 and a air discharge pipe 18 match the corresponding pipes of the actual regulating valve.

Provided at the inlet to pipe 17 is a bypass (not shown in the figure) designed to simulate pressure pulses generated in the actual regulating valve when steam flows through an automatic shutter valve. This shutter valve (not shown) is a safety device normally installed in the line supplying steam to a turbine, when steam passes through this valve, steam pressure is caused to vibrate and to induce forced oscillations in the valve as in a "bypass" which stimulates similar oscillations.

Attached on the upper ring plate 6 are strain gauges (not shown in the figure) designed to measure the frequency and the amplitude of the longitudinal mechanical oscillation of the mobile system of the mocked-up valve. Provided in the flow-type chamber 15 are transmitters of pressure fluctuations (not shown in the figures), whose readings help judge of the frequency and the amplitude of the natural acoustic oscillation of air.

The rotation of the nut 8 results in movement of the traveling bush 5 and the coupled stem 3 together with the key 9 and displacement of the traveling bush 5 is stopped by the lock nut 10 and the bolts 12. The value of the uplift of the stem 3 is determined by the scale 13 fitted with the vernier 14. The abovementioned method helps set, in succession, a number of uplifts of the stem 3 of the simulated valve from zero value (where the head 4 is just touching the seat 19) to complete valve opening. It is necessary to record the value of an uplift of the stem 3 of the valve, which obtains the maximum amplitude of the longitudinal mechanical vibration of the mobile system, and to specify its frequency spectrum.

Continuing further, the stem 3 is displaced by the abovestated method into a position at which the vibration of the valve operating system ceases; then the stem 3 is moved, by the same adjustments, to a position which is as close as possible to the position at which the maximum amplitude of the longitudinal mechanical oscillation has been recorded which has not yet made possible the vibration of the valve mobile system.

This position of the stem is set for recording a frequency spectrum of the acoustic vibration of the air within the flow chamber 15 of the valve. The frequency of the acoustic vibration of the working fluid medium in the flow chamber, to which the maximum amplitude corresponds, is subject to comparison to the natural frequency of the longitudinal mechanical vibration of the valve mobile system; thereafter both of the frequencies must be brought out of coincidence.

The bringing out of coincidence of the natural frequency of the longitudinal mechanical vibration of the valve mechanism is done by varying the thickness of the ring plates 6 and/or the mass of the weight 7.

The bringing out of coincidence of the natural frequency of the acoustic vibration of the air in the flow chamber 15 of the valve is accomplished by varying the dimensions and/or the shape of this chamber.

Figure 2:
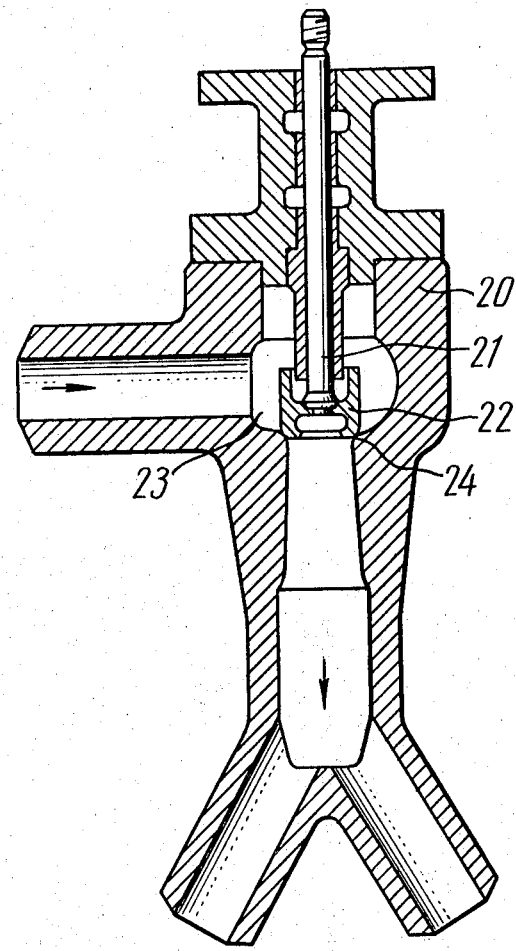
FIG. 2 shows a regulating valve brought out of coincidence by the natural frequency of the longitudinal mechanical vibration of the operating system.

The regulating valve (FIG. 2) brought out of coincidence with its natural frequency of the longitudinal mechanical oscillation comprises a body 20 housing the valve parts and seat the valve consists of a stem 21 with a head 22, said stem being coupled with the drive mechanism (not shown in the figure). The head 22 is provided in a flow chamber 23 of said valve to control the flow rate of steam by varying the valve opening between the head 22 and a seat 24 of the valve. The direction of the steam flow in the valve is indicated by arrows.

The stem 21 of the valve is constructed with an increased diameter and a reduced length as compared with known types, while the head 22 of said vlave is made hollow and opens from the bottom side.

The geometrical dimensions and the mass of the valve mechanism (the stem 21 with the head 22) are selected so that the natural frequency of the first form of the longitudinal mechanical vibration of the mechanism is twice as high as the natural frequency of the acoustic vibration of the steam in the flow chamber 23 of the valve.

The valve drive mechanism moves the stem 21 inside the body 20, as a result of the displacement of the stem 21, the head 22 of the valve takes a position, in relation to the valve seat 24, which provides the required steam flow.

The method of eliminating vibrations of the regulating valve helps provide a construction of the regulating valve, which is proof against vibrations at all modes of the steam turbine.

I claim:

1. A method for eliminating vibrations of a regulating vlave provided in a working fluid medium feed line and including a flow chamber and an actuation system comprising a stem coupled with an actuator, a head accomodated in said flow chamber of the valve to control the working fluid medium flow rate, characterized by the steps of: determining the natural frequency of the mechanical vibration of said actuation system of said valve during a stem uplift corresponding to the mode of vibration of said valve; determining, during the same stem uplift, the natural frequency of the acoustic vibration of the working fluid medium in said flow chamber of said valve; and comparing the obtained frequencies and bringing the natural frequency of the working medium out of coincidence with the natural frequency of the mechanical vibration of said actuation system of said valve.

2. A method as claimed in claim 1, characterized in which the natural frequency of the mechanical vibration of said actuation system of valve is determined at least for the first form of the longitudinal mechanical vibration at the head and stem.

3. A method as claimed in claim 1, characterized in which the natural frequency of the acoustic vibration of the working fluid medium in said flow chamber of said valve is determined within a range of frequencies of the acoustic vibration, the upper limit of said range being at least twice as high as the natural frequency of the longitudinal mechanical vibration of said actuation system of said valve, with the lower limit being at least twice as low as the natural frequency of the longitudinal mechanical vibration of said actuation system of said valve.

4. A method as claimed in claim 1, characterized in bringing the natural frequency of the mechanical vibration of said actuation system of said valve out of coincidence is effected by varying at least one of the size of said actuation system or its mass.

5. A method as claimed in claim 1, characterized in that bringing the natural frequency of the acoustic vibration of the working fluid medium in said flow chamber of said valve is effected by varying at least one of the shape or the size of said flow chamber.

* * * * *